United States Patent
Salmela et al.

(10) Patent No.: US 8,553,883 B2
(45) Date of Patent: Oct. 8, 2013

(54) METHOD AND APPARATUS FOR MANAGING SUBSCRIPTION CREDENTIALS IN A WIRELESS COMMUNICATION DEVICE

(75) Inventors: Patrik Mikael Salmela, Kirkkonummi (FI); Vesa Petteri Lehtovirta, Espoo (FI); Kristian Slavov, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1384 days.

(21) Appl. No.: 12/140,728

(22) Filed: Jun. 17, 2008

(65) Prior Publication Data

US 2009/0217364 A1 Aug. 27, 2009

Related U.S. Application Data

(60) Provisional application No. 61/030,799, filed on Feb. 22, 2008.

(51) Int. Cl.
*H04L 29/06* (2006.01)
(52) U.S. Cl.
USPC .............................. 380/247; 380/249; 726/5
(58) Field of Classification Search
USPC ................... 726/5, 6, 18; 380/273, 247, 249; 713/175
See application file for complete search history.

(56) References Cited

U.S. PATENT DOCUMENTS

| | | | | |
|---|---|---|---|---|
| 6,119,001 A | * | 9/2000 | Delis et al. | 455/433 |
| 6,957,060 B1 | * | 10/2005 | Sharp | 455/410 |
| 7,526,642 B2 | * | 4/2009 | Hurtta et al. | 713/155 |
| 2005/0037753 A1 | | 2/2005 | Andersen et al. | |
| 2006/0079219 A1 | * | 4/2006 | Nicolini | 455/423 |
| 2006/0291422 A1 | * | 12/2006 | Rochford | 370/331 |
| 2007/0124818 A1 | * | 5/2007 | Bumiller et al. | 726/26 |
| 2007/0209081 A1 | * | 9/2007 | Morris | 726/29 |
| 2007/0277248 A1 | * | 11/2007 | Agrawal et al. | 726/30 |
| 2008/0125043 A1 | * | 5/2008 | Karmanenko et al. | 455/41.2 |
| 2009/0037979 A1 | * | 2/2009 | Dellaratta et al. | 726/2 |

FOREIGN PATENT DOCUMENTS

| | | |
|---|---|---|
| EP | 0778716 A2 | 6/1997 |
| EP | 1645931 | 4/2006 |
| EP | 1758335 A1 | 2/2007 |

OTHER PUBLICATIONS

3rd Generation Partnership Project. "3GPP TR 33.812 V0.1.0. 3rd Generation Partnership Project; Technical Specification Group Services and System Aspects; Feasibility Study on Remote Management of USIM Application on M2M Equipment; (Release 8)." Jan. 2008.

(Continued)

*Primary Examiner* — Edward Zee
*Assistant Examiner* — Chi Nguy
(74) *Attorney, Agent, or Firm* — Coats and Bennett PLLC (57) ABSTRACT

According to the teachings presented herein, a wireless communication device reverts from subscription credentials to temporary access credentials, in response to detecting an access failure. The device uses its temporary access credentials to gain temporary network access, either through a preferred network (e.g., home network) or through any one of one or more non-preferred networks (e.g., visited networks). After gaining temporary access, the device determines whether it needs new subscription credentials and, if so, uses the temporary access to obtain them. Correspondingly, in one or more embodiments, a registration server is configured to support such operations, such as by providing determination of credential validity and/or by redirecting the device to a new home operator for obtaining new subscription credentials.

28 Claims, 5 Drawing Sheets

(56) References Cited

OTHER PUBLICATIONS

3rd Generation Partnership Project. "3GPP TR 33.812 V0.2.2. 3rd Generation Partnership Project; Technical Specification Group Services and System Aspects; Feasibility Study on Remote Management of USIM Application on M2M Equipment; (Release 8)." Mar. 2008.
3rd Generation Partnership Project. "3GPP TR 33.812 V0.3.0. 3rd Generation Partnership Project; Technical Specification Group Services and System Aspects; Feasibility Study on Remote Management of USIM Application on M2M Equipment; (Release 8)." May 2008.
3rd Generation Partnership Project. "3GPP TS 43.020 V7.2.0. 3rd Generation Partnership Project; Technical Specification Group Services and System Aspects; Security Related Network Functions (Release 7)." Dec. 2007.
Gehrmann, C. "Method and System for Mobile Device Credentialing." Co-pending U.S. Appl. No. 11/948,352, filed Nov. 30, 2007.
Gehrmann, C. "Secure Soft SIM Credential Transfer." Co-pending U.S. Appl. No. 11/944,818, filed Nov. 26, 2007.
Lehtovirta, V. P. et al. "Methods and Apparatus for Locating a Device Registration Server in a Wireless Network." Co-pending U.S. Appl. No. 12/139,773, filed Jun. 16, 2008.
Salmela, P. M. et al. "Methods and Apparatus for Wireless Device Registration." Co-pending U.S. Appl. No. 12/135,256, filed Jun. 9, 2008.
BT et al., "Changes to TR33.812, v0.1.0, "network architecture alternatives" section", 3GPP TSG SA WG3 Security #50, Sanya, China, Feb. 25, 2008, pp. 1-22, S3-080014, [Retrieved on Apr. 2, 2013], Retrieved from Internet: http://www.3gpp.org/ftp/specs/html-info/TDocExMtg--S3-50--26846.htm; 3GPP.

\* cited by examiner

METHOD AND APPARATUS FOR MANAGING SUBSCRIPTION CREDENTIALS IN A WIRELESS COMMUNICATION DEVICE

RELATED APPLICATIONS

This application claims priority under 35 U.S.C. §119(e) from the U.S. Provisional Patent Application Ser. No. 61/030, 799, which was filed on 22 Feb. 2008, and entitled "Change of Operator for DLUSIM Enabled Device."

TECHNICAL FIELD

The present invention generally relates to wireless communication devices, such as mobile communication handsets and machine-to-machine (M2M) devices, and particularly relates to managing subscription credentials in such devices.

BACKGROUND

Secure and convenient management of subscription credentials stands as an ongoing challenge in the field of wireless communications. In some markets, and for some types of devices, device provisioning is done at the point of sale and the device purchaser takes delivery of a fully provisioned device that is ready for network activation/use. Provisioning in this sense includes securely storing subscription credentials in the device, which link the device to a given network service provider (home operator) and allow it to authenticate itself to the operator's home network, and to any number of visited networks, subject to roaming agreements, etc.

With conventional 3G cellular telephones, provisioning is typically accomplished using a Universal Subscriber Identity Module (USIM), an application installed on a Universal Integrated Circuit Card (UICC) provided by the wireless network operator. The USIM/UICC may be inserted into a cellular handset to tie the handset to a particular subscription, thus allowing the handset user to access subscribed services through his home operator's network and, in many cases, through cooperating partner networks. Although reasonably convenient for individual consumers, this approach to provisioning may be impractical for an M2M application where a single entity may deploy hundreds of wireless devices across a large geographical area.

For instance, in some cases a wireless device may be factory installed in a larger piece of equipment (e.g., an automobile), making later insertion of a SIM card impractical or impossible. In other instances, M2M devices may be deployed over a wide geographical area, such that no single wireless operator can provide the needed coverage. In such cases, matching the proper operator-specific USIMs to the correct devices can be problematic. Finally, re-configuring the M2M device, e.g., to transfer the device to a subscription with a different operator, can be expensive, especially when the M2M device is in a remote location.

Other approaches to initial device provisioning are known. Rather than delivering a fully provisioned device to its purchaser, one approach to provisioning provides for the sale and/or distribution of preliminarily provisioned devices. A preliminarily provisioned device includes limited access credentials that are recognized by one or more network operators, and that permit the device to gain temporary network access. Such temporary access credentials may be loaded by the device manufacturer, for example.

Typically, in a separate transaction, the device purchaser will have selected a home operator for the device and activated a subscription for it. The device gains temporary network access using its temporary access credentials to obtain long-term subscription credentials from the selected home operator, or from an associated credentialing service. This arrangement allows devices to be sold in advance of tying them to specific network operators, or to specific subscription arrangements, and it relies on subsequent over-the-air (OTA) provisioning of the devices, based on their ability to gain temporary network access via their limited-used credentials.

The use of temporary credentials offers potentially significant advantages to device purchasers, particularly for some types of devices. For example, a company may purchase many thousands of M2M devices, each holding temporary access credentials. These devices may be held in inventory without incurring subscription charges, and deployed as needed. Moreover, the device owner can select and activate subscriptions for these devices en masse or individually, with one or more network operators, through separate transactions not relying on device connectivity. Once fielded or otherwise deployed, each such M2M device uses its temporary access credentials to gain initial network connectivity, which then allows it to contact a home operator or perhaps a generic registration service having knowledge of its home operator identity. With such access, the device downloads long-term subscription credentials for its home operator, and uses those long-term subscription credentials for any subsequent network access.

However, once devices are subscribed and are operating with long-term subscription credentials, device owners face potentially significant challenges in changing subscription plans, and particularly when changing home operator affiliations. For example, for reasons of cost, size, or both, M2M devices generally lack user interfaces, and they often have limited functionality software/firmware, tailored to their intended installations. Such minimalist implementations can make it difficult to interact with M2M devices, and, in particular, can make it difficult to manage subscription credentials in such devices. For example, it may be difficult for a company to conveniently replace subscription credentials in fielded M2M devices.

SUMMARY

According to the teachings presented herein, a wireless communication device reverts from subscription credentials to temporary access credentials, in response to detecting an access failure. The device uses its temporary access credentials to gain temporary network access, either through a preferred (e.g., home network) or through any one of one or more non-preferred networks (e.g., visited networks). After gaining temporary access, the device determines whether it needs new subscription credentials and, if so, uses the temporary access to obtain them. Correspondingly, in one or more embodiments, a registration server is configured to support such operations, such as by providing determination of credential validity and/or by redirecting the device to a new home operator for obtaining new subscription credentials.

While not limited to machine-to-machine (M2M) devices, methods and apparatuses for credential reversion as taught herein are particularly advantageous in that they allow M2M devices to autonomously detect problems with their current subscription credentials, and use their temporary access credentials to gain new/updated subscription credentials. As such, an owner of many hundreds or thousands of M2M devices can change subscription agreements for some or all of the devices, without having to contact or otherwise interact with the devices. To the extent that any subscription agreement change invalidates device-held subscription credentials, each such device will detect access failure with its current subscription credentials and revert to temporary access credentials and contact a registration service or other entity to determine if new subscription credentials are needed.

In at least one embodiment, the subscription credentials are long-term, operator-issued credentials tied to a specific subscription agreement home operator. In the same or other embodiments, the temporary access credentials are "generic" credentials that allow temporary, limited network access. For example, any number of network operators may have configured their networks to permit temporary connectivity to devices having authenticated temporary access credentials. In at least one embodiment, the temporary access credentials contemplated herein comprise a preliminary international mobile subscriber identity (PIMSI) or other identifier that allows the wireless communication device to authenticate itself to any number of operator networks. The temporary access credentials also may include other data elements, such as keys. By way of non-limiting example, the temporary access credentials are permanently stored in the wireless communication device, and are loaded, for example, by the device manufacturer.

However, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
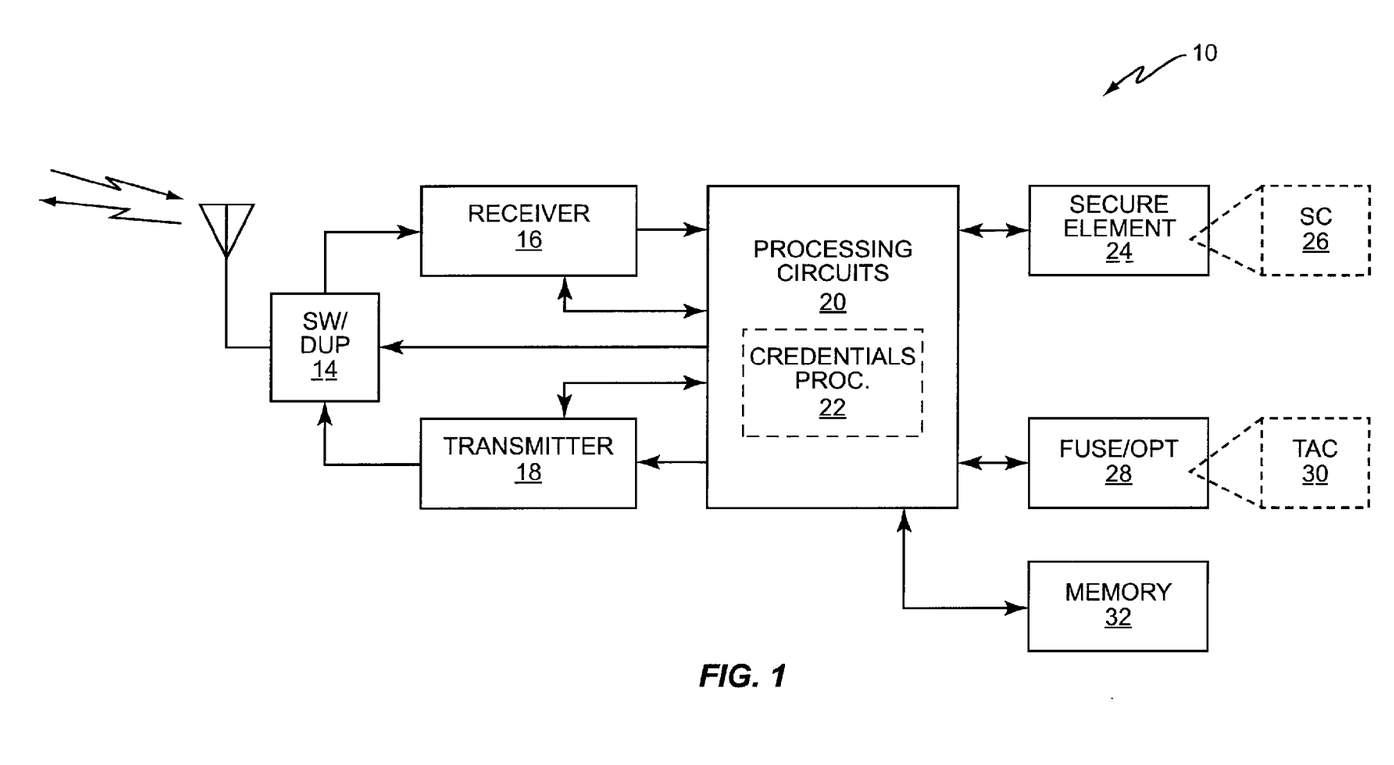
FIG. 1 is block diagram of one embodiment of a wireless communication device configured to perform credentials reversion.

FIG. 1 illustrates one embodiment of a wireless communication device 10 that is advantageously configured to perform credential reversion as taught herein. While such details are not limiting, the illustrated device includes one or more antennas 12, a switch and/or duplexer 14, a wireless signal receiver 16, and wireless signal transmitter 18, one or more processing circuits 20, including a credentials processor 22, a secure element 24, which may store subscription credentials (SC) 26, and a fuse/one-time-programmable (OTP) memory element 28, which may be used to store temporary access credentials (TAC) 30. The device 10 also includes a memory 32, which may include one or more memory devices, for storing working data, computer program instructions, and configuration information.

As non-limiting examples, the device 10 is a cellular communication device, such as a cellular radiotelephone, pager, PDA, computer or network access card. In a particular example, the device 10 is a machine-to-machine (M2M) device, such as a cellular communication module configured for embedding in other devices and systems, such as vending machines, gas meters, automobiles, etc.

In operation, the device 10 uses its subscription credentials 26 for gaining network access, although the device 10 may have used its temporary access credentials 30 for gaining temporary access as a basis for obtaining the subscription credentials 26 via over-the-air (OTA) provisioning. However, the subscription credentials 26 are considered "permanent" or at least long-term subscription credentials, as they generally remain valid for as long as the owner of the device 10 maintains a corresponding subscription agreement with the home network operator that issued the subscription credentials 26.

In at least one embodiment, the subscription credentials 26 comprise a downloadable Universal Subscriber Identity Module (USIM), which may include an international mobile subscriber identifier (IMSI). Further, in at least one embodiment, the temporary access credentials 30 comprise a preliminary international mobile subscriber identity (PIMSI) or other identifier that can be used by the device 10 to authenticate itself to any one of one or more network operators that accept temporary access credentials. The temporary access credentials 30 may, for example, be burned into secure fuses or other secure OTP memory within the device 10, during its manufacture or initial configuration.

Advantageously, the device 10 includes a "credentials processor" 22 that is configured to revert from the subscription credentials 26 to the temporary access credentials 30, responsive to detecting network access failure. That is, in one or more embodiments, the device 10 uses its subscription credentials 26 for gaining network access unless and until it is unable to gain access using those credentials. At that point, the device 10 advantageously reverts to its temporary access credentials 30. Those credentials generally do not expire and generally are not subject to invalidation, except in select instances of theft or other known security compromises.

The device 10 thus (automatically and autonomously) switches from its provisioned subscription credentials 26 to its temporary access credentials 30, and uses those temporary access credentials 30 to gain temporary network access. In turn, the device 10 uses its temporary access to determine whether it needs new subscription credentials. If so, it uses its temporary access to obtain new subscription credentials, which it may download to its secure element 24, for example. If the device 10 does not determine that it needs new subscription credentials, it can revert back to its stored subscription credentials 26 and continue its access attempts.

Figure 2:
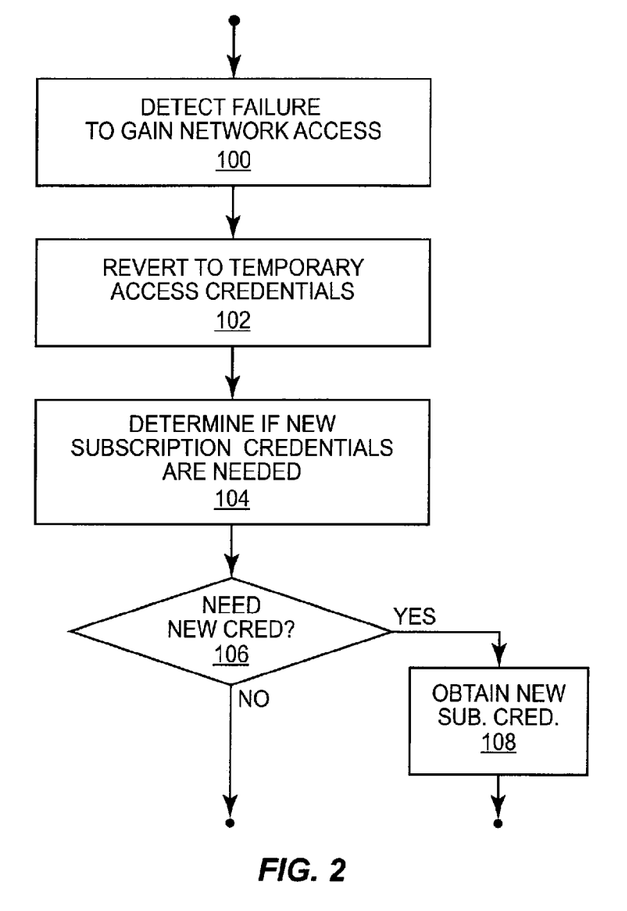
FIG. 2 is a logic flow diagram of one embodiment of processing logic implementing credentials reversion at a wireless communication device.

FIG. 2 illustrates one embodiment of processing logic that can be implemented in the credentials processor 22, which may comprise an actual processing circuit or a functional processing element within the processing circuits 22. For example, the credentials processor 22 may be implemented via software executing in one or more microprocessor circuits used to implement the processing circuits 20. Those skilled in the art will appreciate that the sequential processing and processing order depicted in FIG. 2 are for purposes of discussion, unless otherwise noted. The processing order may be changed in at least some respects, at least some of the processing may be done concurrently, and at least some of the processing may be performed along with other processing tasks, and looped or repeated as needed.

With the above in mind, the illustrated processing implements a method of managing subscription credentials in the device 10. In terms of the illustrated processing steps, the method includes detecting a failure to gain network access using the current subscription credentials 26 held in the wireless communication device 10 (Block 100). Processing continues in response to detecting such failure, with reverting from the current subscription credentials 26 to the temporary access credentials 30 (Block 102), also held in the wireless communication device 10. Processing continues with determining whether new subscription credentials are needed based on gaining temporary network access via the temporary access credentials (Bock 104/106). If new subscription credentials are needed, processing continues with obtaining new subscription credentials for the wireless communication device 10 via the temporary network access (Block 108).

Figure 3:
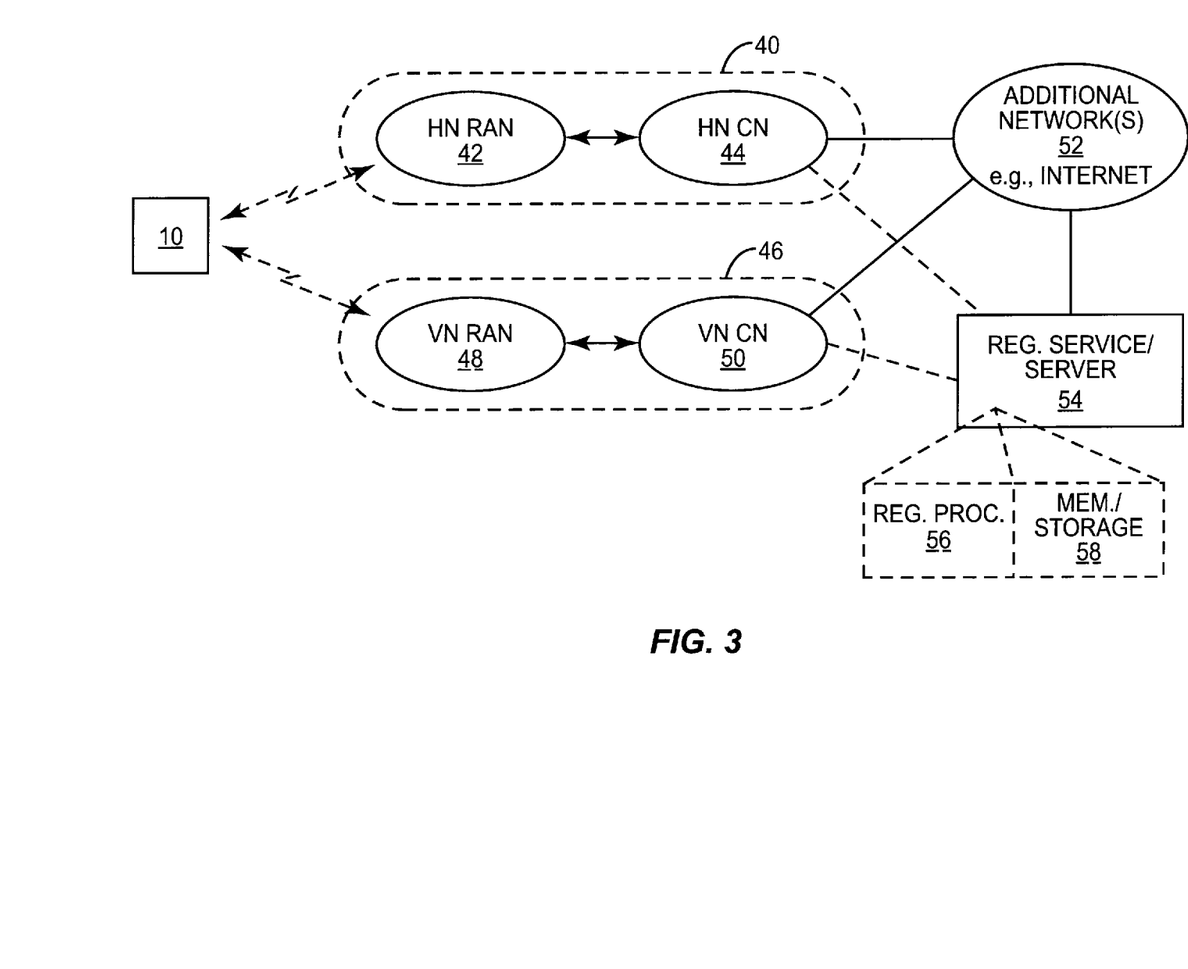
FIG. 3 is a block diagram of one embodiment of home and visited networks, and a registration server that is configured to support wireless communication devices in determining whether new subscription credentials are needed by them.

More detailed examples of the above credentials reversion method may be better understood in the context of FIG. 3, which illustrates a home network 40, including a radio access network (RAN) 42 and a core network (CN) 44, and illustrates a visited network 46, including a RAN 48 and a CN 50. The home and visited networks 40 and 46 may communicatively couple together and/or they may provide communicative coupling to one or more additional networks 52, such as the Internet. Of course, it should be understood that, broadly, multiple operator networks may be involved in all or part of the operations disclosed herein. For example, assuming the wireless communication device 10 determines that it cannot gain access or otherwise cannot communicate using its current subscription credentials, it reverts to its temporary access credentials (preliminary credentials), to gain temporary access for the purpose of acquiring new subscription credentials. As regards the wireless communication device 10, the given network through which it gains access, at least at the radio access network level, may or may not be the device's "home" network. For example, the wireless communication device 10 may attempt to gain access through a visited network using its temporary access credentials. In any case, when the wireless communication device 10 authenticates to a network using its temporary access credentials (preliminary credentials), there is in some sense a "preliminary operator." The preliminary operator is an operator that also has the preliminary credentials (or at least can authenticate them), thereby allowing the preliminary operator to authenticate the wireless communication device 10 to whichever network the wireless communication device 10 attempts to connect with. The "preliminary operator" also may be referred to as a "registration operator."

The registration operator may operate the registration service/server discussed herein, or the service/server may be implemented elsewhere (e.g., at a third-party, internet-accessible server). In either case, it should be understood that the registration operator network may well be the visited network or the home operator network for the wireless communication device 10, but it is not necessary for the device to know whether such is the case; rather, the device simply offers its preliminary credentials for authentication and the network to which the device has attempted connection will either authenticate those credentials, or transfer them to the registration operator network for authentication. Thus, any number of operator networks may be involved in the process of authenticating the device's temporary access credentials, and in communicatively coupling the device to a registration service for gaining new subscription credentials.

Returning to the illustrated details, the external network connectivity connects the home and visited networks 40 and 46 to a registration server 54, which is configured as a web server (or other IP network-accessible system) in one or more embodiments. The registration server 54 provides a registration service, whereby device owners and/or home network operators can "register" communication devices. The registration server 54 includes or is associated with a registration processor 56, which may be a computer system, and associated memory/storage systems 58, for storing registration information. Additionally, or alternatively, either or both the home network 40 and visited network 46 have direct communication links with the registration server 54.

The home network 40 and the visited network 46 may or may not differ in any substantive regard, and the "home" and "visited" terms as used in this context may denote no more than that the owner of the device 10 has entered into a subscription agreement with the service provider that owns or otherwise operates the home network 40. Thus, it may be that the device 10 "sees" radio signals from the home network RAN 42, and from the visited network RAN 48, and thus could use either one for gaining network connectivity. However, given that the device's current subscription credentials 26 are issued by the home network operator, gaining network access through the RAN 42/CN 44 is preferable to gaining network access through the RAN 48/CN 50.

In other contexts, such as where the device 10 is outside of its home network service area, it may be that only visited networks are available to it. However, with roaming agreements, and the like, the device 10 still will use its current subscription credentials 26, as issued by its home network operator. More broadly, it should be understood that, at any given instant, the device 10 may be operating in an area where multiple RANs are available to it, for gaining network access. However, one of the RANs generally is preferred, and the other one or more of them are non-preferred.

Figure 4:
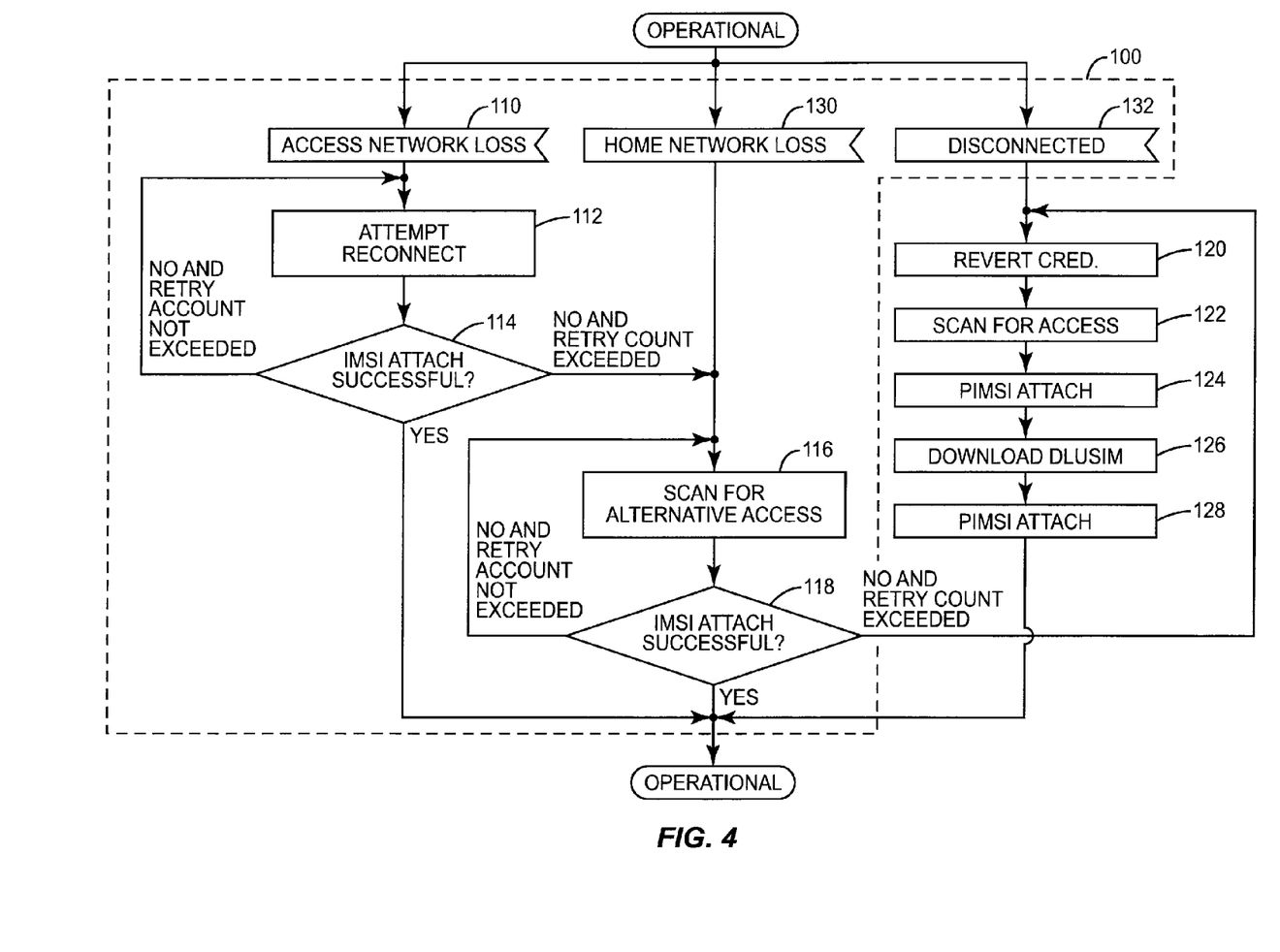
FIG. 4 is a logic flow diagram of one embodiment of detailed processing logic implementing credentials reversion at a wireless communication device.

With the above in mind, FIG. 4 provides a more detailed illustration of the credentials reversion method outlined in FIG. 2. The "operational" state illustrated at the outset of the processing in FIG. 4 denotes that the device 10 holds current subscription credentials 26, and successfully gained network access using those credentials during its most recent prior connection, for example. From there, one sees that Block 100 (from FIG. 2) may include multiple methods of detecting a failure to gain network access. As a first example, the device 10 may detect access loss for its local (preferred) RAN (Block 110). In the illustrated embodiment, the device 10 is configured to attempt reconnection using its current subscription credentials 26—e.g., using its stored IMSI—for some number of attempts (Blocks 112 and 114).

If these retries are unsuccessful over some bounded number of retry attempts, the device 10 scans for alternative access (Block 116). Thus, according to the logic of blocks 112 and 114, the credentials processor 22 controls or otherwise causes the device 10 to attempt a limited number of reattachments using its preferred network, and, if that fails, to attempt one or more additional reattachments to one or more non-preferred networks. These non-preferred network attachments are also attempted using the device's current subscription credentials 26, and they are subject to some retry count limit.

If IMSI-based attachment is not successful (no from Block 118), the device 10 regards such circumstances as the detection of a failure to gain network access (i.e., the "failure" detected in Block 100, FIG. 2). Responsive to that failure detection, the device 10 reverts from the current subscription credentials 26 to the temporary access credentials 30 (Block 120), and scans for network access (Block 122). It may scan for locally available RANs, whether they are preferred or not (although it may first try preferred RANs). In any case, the device 10 gains temporary network access to an available network using its temporary access credentials (Block 124), e.g., it performs a PIMSI-based temporary attachment.

The device 10 then uses that temporary network access to obtain new subscription credentials (Block 126), which comprises downloading a new or updated USIM in one or more embodiments. Once the device 10 obtains new subscription credentials, they replace its previously current subscription credentials, and the newly obtained subscription credentials become the device's current subscription credentials 26. The device 10 uses these newly current subscription credentials 26 to gain network access (Block 128), e.g., it performs an IMSI-based attachment. (Note that this illustration assumes that the network failure arises because the device 10 needs new subscription credentials, but the device 10 may be configured to perform an explicit determination of whether or not that is true, once it gains temporary network access.)

In another instance of detecting network access failure, the device 10 experiences a loss of its home network (Block 130), which may mean that the device 10 can communicate with a local RAN, but is not recognized or otherwise authenticated by its home network. If this condition occurs, the device 10 carries out the processing of blocks 116 and 118, as described above. If that processing does not result in successful access using its current subscription credentials 26, the device 10 determines that it has experienced a network access failure (Block 100, FIG. 2). Thus, according to the credential reversion method taught herein, detecting a failure to gain network access using the current subscription credentials 26 held in the wireless communication device 10 comprises making one or more initial access attempts through a preferred access network using the current subscription credentials 26. If these initial one or more access attempts are unsuccessful, continuing the method by making one or more subsequent access attempts through one or more non-preferred access networks available to the wireless communication device 26, also using the current subscription credentials 26.

In yet another instance of detecting network access failure, the device 10 is explicitly disconnected from its home network (Block 132). In one example, the home network sends signaling—e.g., a message—to the device 10 that indicates that the device's subscription credentials are expired or otherwise invalid. The device 10 recognizes such signaling as an explicitly indicated network access failure, and therefore reverts to its temporary access credentials 30. Thus, according to the credential reversion method taught herein, detecting a failure to gain network access using current subscription credentials 26 held in the wireless communication device 10 comprises receiving a failure message responsive to attempting to gain network access using the current subscription credentials 26.

As described, the device 10 is configured to perform a reversion to its temporary access credentials 30, responsive to detecting a network access failure as just detailed. In at least one method embodiment, this reversion comprises substituting limited access credentials that are preconfigured in the wireless communication device 10 in place of the current subscription credentials 26, for use in gaining network access. The limited access credentials comprise, in at least one embodiment, a PIMSI or other identifier permanently held in the wireless communication device 10.

In further method details for at least one embodiment taught herein, determining whether new subscription credentials are needed based on gaining temporary network access via the temporary access credentials 30 comprises contacting a registration service via the temporary network access and communicating with the registration service to determine whether new subscription credentials are needed. For example, the device 10 contacts a registration server 54 as shown in FIG. 3, or contacts another network-accessible entity having some knowledge of its current subscription status.

In at least one embodiment, communicating with the registration service to determine whether new subscription credentials are needed comprises receiving a hash value from the registration service, generating a hash value based on the current subscription credentials as held by the wireless communication device 10, and determining that new subscription credentials are needed by detecting a mismatch between the hash values. In another embodiment, the wireless communication device 10 receives a time stamp that it compares with a time stamp it holds for its current subscription credentials, as a basis for determining whether it needs new subscription credentials.

In another embodiment, communicating with the registration service to determine whether new subscription credentials are needed comprises sending a hash value to the registration service that is based on current subscription credentials as held by the wireless communication device 10, and receiving a return indication from the registration service that new subscription credentials are needed. Similarly, in another embodiment, communicating with the registration service to determine whether new subscription credentials are needed comprises sending a time stamp to the registration service that is based on current subscription credentials as held by the wireless communication device 10, and receiving a return indication from the registration service that new subscription credentials are needed.

Broadly, the wireless communication device 10 implements a method in one or more embodiments, wherein it is configured to communicate with the registration service to determine whether new subscription credentials are needed. That determination is made by the wireless communication device 10 sending first information, which is associated with the current subscription credentials as held by the wireless communication device 10, to the registration service for evaluation, and receiving a return indication from the registration service. For example, the return indication indicates whether new subscription credentials are needed. The first information may be a time stamp for the current subscription credentials or a hash value derived from them.

Similarly, in another embodiment, the wireless communication device 10 implements a method whereby it communicates with the registration service to determine whether new subscription credentials are needed based on the wireless communication device 10 comparing the first information held at the wireless communication device 10 with second information received from the registration service. As before, the first information comprises, for example, a time stamp or hash value for the current subscription credentials as held by the wireless communication device 10. Likewise, the second information may comprise a time stamp or hash value for subscription credentials that are considered by the registration service to be current for the wireless communication device 10.

In another aspect of such processing, obtaining new subscription credentials for the wireless communication device 10 comprises, in at least one embodiment, receiving network address information from the registration service that identifies a credentialing server from which the new subscription credentials are to be obtained, and using the temporary network access to contact the credentialing server to obtain the new subscription credentials. Note that the credentialing server is, in one or more embodiments, an entity in or operating under control of the CN of the service provider that issued the new subscription credentials.

Further, in one or more embodiments, the credential reversion method includes, after obtaining the new subscription credentials, changing from the temporary access credentials to the new subscription credentials for subsequently gaining network access, while retaining the temporary access credentials at the wireless communication device 10 for future reversion as needed. That is, the device 10 can replace or deactivate its formerly current subscription credentials and use the newly acquired subscription credentials as its newly current subscription credentials 26, to be used for subsequent network accesses, while retaining its temporary access credentials 30 in case further reversions are needed.

On that point, in one or more embodiments, the device 10 is configured to revert from the current subscription credentials 26 to the temporary access credentials 30 without permanently deactivating or otherwise invalidating its subscription credentials 30. In this manner, the device 10 can revert upon access failure, and use its temporary access credentials to determine whether new subscription credentials are needed. If the device 10 receives no indication that new subscription credentials are needed, or otherwise cannot make such determination, it returns to using its current subscription credentials 26 and may continue with periodic access attempts using them. Additionally, or alternatively, it may alternate between using its temporary access credentials 30 in attempts to determine whether there is a problem with its current subscription credentials 26, and using those subscription credentials 26 in regular access attempts.

Figure 5:
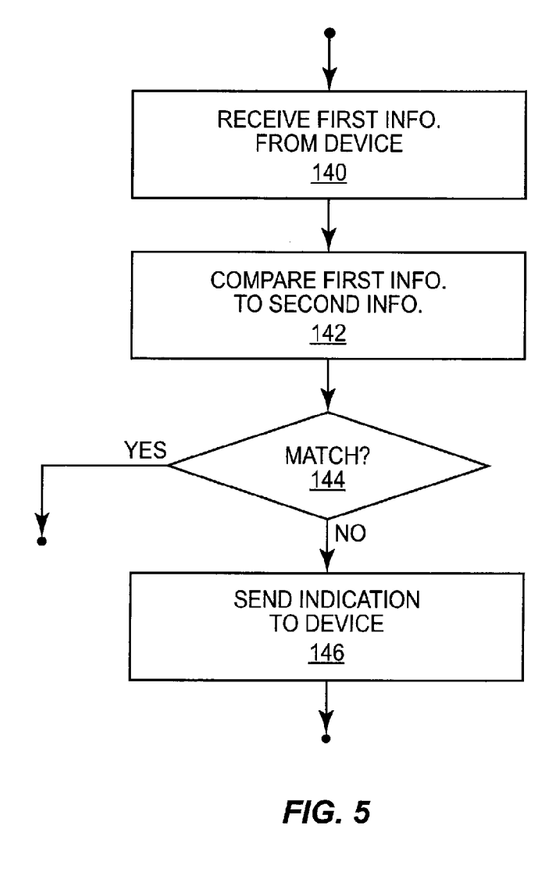
FIG. 5 is a logic flow diagram of one embodiment of processing logic at a registration server to implement a method of supporting wireless communication devices in determining whether new subscription credentials are needed by them.

Regarding operations of the registration server 54, as introduced in FIG. 3, it implements a method of facilitating the automatic acquisition of new subscription credentials by wireless communication devices. FIG. 5 illustrates processing logic for implementing one embodiment of the method. As with the other logic flow diagrams presented herein, the illustrated processing order is not intended to be limiting, and at least some of the processing operations can be performed in other orders and/or concurrently or as part of other processing.

With that in mind, the illustrated processing "begins" with receiving first information from a wireless communication device that has gained temporary network access (Block 140). This first information is included in or derived from the current subscription credentials held by the wireless communication device. For example, the device 10 reverts to its temporary access credentials 30, gains temporary network access, contacts the registration server 54, and sends first information to the registration server 54 for the device's currently held subscription credentials 26.

Processing at the registration server 54 continues with comparing the first information to second information held by the registration server 54 (Block 142). The second information is included in or derived from the current subscription credentials associated with a current home network operator of the wireless communication device. The subscription credentials considered "current" by the subscription server 54 may or may not match those considered as "current" by the device. Indeed, one advantage contemplated herein is that a device owner can change subscriptions without having to first update the affected device.

In general, the first and second information is of the same type and format and is designed to match or otherwise indicate agreement if the subscription credentials 26 held at the device correspond to the subscription credentials considered by the registration server 54 to be current for the device. By way of non-limiting example, the first and second information comprises time stamp information, which, for example, may be compared to determine if the subscription credentials 26 are out of date. That is, the current subscription credentials as held by the wireless communication device 10 may include a first time stamp, while the subscription credentials that are considered by the registration service to be current for the wireless communication device 10 may include a second time stamp. Thus, the wireless communication device 10 can send the first timestamp to the registration service for evaluation, or the registration service can send the second timestamp to the wireless communication device for evaluation. Other types of data can be used in similar comparative-based determinations of whether new subscription credentials are needed.

For example, in another embodiment, the first information is a hash value derived from the device's current subscription credentials, while the second information is a hash value derived in like manner from the subscription credentials considered by the registration server 54 to be current for the device. Broadly, the registration server 54 compares or otherwise evaluates the first and second information to determine whether the device needs to obtain new subscription credentials. If the registration server 54 detects a mismatch between the first and second information (No from Block 144), it sends an indication to the device that the device needs to obtain new subscription credentials (Block 146).

The above processing can be implemented at the registration server 54, such as by appropriate hardware and/or software configuration of the registration processor 56 that is illustrated in FIG. 3. In that regard, the registration server 54 may be configured to provide a range of registration services, and in one or more embodiments, it provides communication interfaces for network operators and/or device owners to provide it with registration information for a plurality of devices. Such information can be deleted or modified, as needed, to reflect changing subscription information, operator affiliations, etc. One may refer to the 3GPP technical report, TR 33.812 V0.1.0 (2008-01) for selected registration service information.

Figure 6:
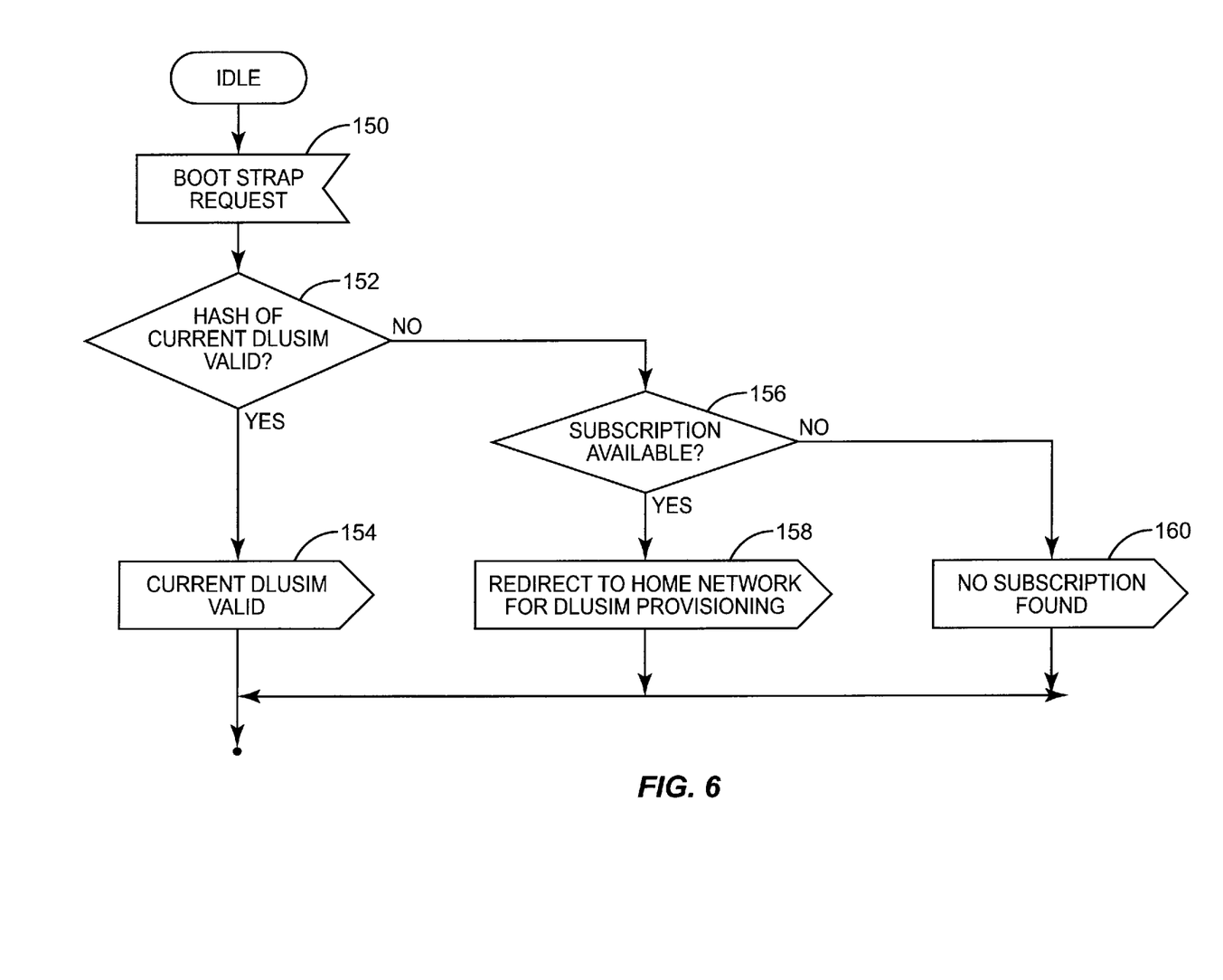
FIG. 6 is a logic flow diagram of one embodiment of detailed processing at a registration server to implement a method of supporting wireless communication devices in determining whether new subscription credentials are needed by them.

For registration service details germane to this discussion, FIG. 6 presents additional processing details for the registration service functions as provided by the registration server 54 and outlined in FIG. 5. This more detailed processing assumes the registration server 54 is idle and receives a "bootstrap" request (Block 150), i.e., it is accessed by a device that has gained temporary network access by reverting to its temporary access credentials 30, where the device is attempting to determine whether its current subscription credentials 26 are valid.

In response, the registration server 54 determines whether a hash of the device's current (software) USIM is valid (Block 152); e.g., the device sends a hash value as the previously described first information, and the registration server 54 attempts to verify that hash value. If the hash value verifies, the registration server 54 deems the device's current subscription credentials 54 as valid (Block 154), e.g., it recognizes the device's current USIM as valid. The registration server 54 can return an indication of credentials validity to the requesting device.

On the other hand, if the hash value does not validate (No from Block 152), the registration server 54 checks whether subscription information is available (Block 156) and, if yes, it sends network address information to the device, to allow the device to obtain new subscription credentials (Block 158).

For example, the registration server 54 redirects the device to a new home network for downloadable USIM provisioning. Also, if the hash value does not validate, but the registration server 54 for some reason does not have access to subscription information that allows it to redirect the device for obtaining new subscription credentials (No from Block 156), the registration server 54 may send such indication to the device (Block 160).

Thus, credentials reversion as taught herein contemplates advantageous method and apparatus implementations at wireless communication devices and/or at registration servers providing registration services. These methods and apparatuses may be implemented in a variety of system and device types. However, as a general proposition, they provide for a wireless communication device to autonomously revert from subscription credentials, e.g., long-term, operator-provisioned subscription credentials, to temporary access credentials, and to use those temporary access credentials to obtain temporary network access for determining whether new subscription credentials are needed. If so, the device uses the temporary network access to obtain new subscription credentials, such as by downloading a new USIM.

As such, the present invention is not limited to the foregoing discussion or by the accompanying drawings. Instead, the present invention is limited only by the following claims and their legal equivalents.

What is claimed is:

1. A method of managing subscription credentials in a wireless communication device comprising:
   detecting a failure to gain network access using current subscription credentials held in the wireless communication device;
   reverting from the current subscription credentials to temporary default limited-access credentials held in the wireless communication device responsive to detecting said failure;
   determining whether new subscription credentials are needed based on gaining temporary network access via the temporary default limited-access credentials; and
   if new subscription credentials are needed, obtaining new subscription credentials for the wireless communication device via the temporary network access.

2. The method of claim 1, wherein detecting a failure to gain network access using current subscription credentials held in the wireless communication device comprises receiving a failure message responsive to attempting to gain network access using the current subscription credentials.

3. The method of claim 1, wherein detecting a failure to gain network access using current subscription credentials held in the wireless communication device comprises making one or more initial access attempts through a preferred access network using the current subscription credentials, and, if the initial one or more access attempts are unsuccessful, making one or more subsequent access attempts through one or more non-preferred access networks available to the wireless communication device, also using the current subscription credentials.

4. The method of claim 1, wherein reverting from the current subscription credentials to temporary default limited-access credentials held in the wireless communication device responsive to detecting said failure comprises substituting temporary default limited-access credentials preconfigured in the wireless communication device in place of the current subscription credentials, for use in gaining network access.

5. The method of claim 4, wherein the temporary default limited-access credentials comprise a preliminary international mobile subscriber identifier permanently held in the wireless communication device.

6. The method of claim 1, wherein determining whether new subscription credentials are needed based on gaining temporary network access via the temporary default limited-access credentials comprises contacting a registration service via the temporary default limited-access network access and communicating with the registration service to determine whether new subscription credentials are needed.

7. The method of claim 6, wherein communicating with the registration service to determine whether new subscription credentials are needed comprises receiving a hash value from the registration service, generating a hash value based on the current subscription credentials as held by the wireless communication device, and determining that new subscription credentials are needed by detecting a mismatch between the hash values.

8. The method of claim 6, wherein communicating with the registration service to determine whether new subscription credentials are needed comprises sending a hash value to the registration service that is based on current subscription credentials as held by the wireless communication device, and receiving a return indication from the registration service.

9. The method of claim 6, wherein communicating with the registration service to determine whether new subscription credentials are needed comprises sending first information, which is associated with the current subscription credentials as held by the wireless communication device, to the registration service for evaluation, and receiving a return indication from the registration service.

10. The method of claim 6, wherein communicating with the registration service to determine whether new subscription credentials are needed comprises determining whether first information, which is held by the wireless communication device for the current subscription information as held by the wireless communication device, matches second information received from the registration service.

11. The method of claim 6, wherein obtaining new subscription credentials for the wireless communication device comprises receiving network address information from the registration service that identifies a credentialing server from which the new subscription credentials are to be obtained, and using the temporary network access to contact the credentialing server to obtain the new subscription credentials.

12. The method of claim 1, further comprising, after obtaining the new subscription credentials, changing from the temporary default limited-access credentials to the new subscription credentials for subsequently gaining network access, while retaining the temporary default limited-access credentials at the wireless communication device for future reversion as needed.

13. A wireless communication device comprising one or more processing circuits configured to:
   detect a failure to gain network access using current subscription credentials held in the wireless communication device;
   revert from the current subscription credentials to temporary default limited-access credentials held in the wireless communication device responsive to detecting said failure;
   determine whether new subscription credentials are needed based on gaining temporary network access via the temporary default limited-access credentials; and
   if new subscription credentials are needed, obtain new subscription credentials for the wireless communication device via the temporary network access.

14. The wireless communication device of claim 13, wherein the wireless communication device is configured to detect a failure to gain network access using current subscription credentials held in the wireless communication device based on receiving a failure message responsive to attempting to gain network access using the current subscription credentials.

15. The wireless communication device of claim 13, wherein the wireless communication device is configured to detect a failure to gain network access using current subscription credentials held in the wireless communication device by making one or more initial access attempts through a preferred access network using the current subscription credentials, and, if the initial one or more access attempts are unsuccessful, making one or more subsequent access attempts through one or more non-preferred access networks available to the wireless communication device, also using the current subscription credentials.

16. The wireless communication device of claim 13, wherein the wireless communication device is configured to revert from the current subscription credentials to temporary default limited-access credentials held in the wireless communication device responsive to detecting said failure by substituting temporary default limited-access credentials preconfigured in the wireless communication device in place of the current subscription credentials, for use in gaining network access.

17. The wireless communication device of claim 16, wherein the temporary default limited-access credentials comprise a preliminary international mobile subscriber identifier permanently held in the wireless communication device.

18. The wireless communication device of claim 13, wherein the wireless communication device is configured to determine whether new subscription credentials are needed based on gaining temporary network access via the temporary default limited-access credentials by contacting a registration service via the temporary network access and communicating with the registration service to determine whether new subscription credentials are needed.

19. The wireless communication device of claim 18, wherein the wireless communication device is configured to communicate with the registration service to determine whether new subscription credentials are needed by receiving a hash value from the registration service, generating a hash value based on the current subscription credentials as held by the wireless communication device, and determining that new subscription credentials are needed by detecting a mismatch between the hash values.

20. The wireless communication device of claim 18, wherein the wireless communication device is configured to communicate with the registration service to determine whether new subscription credentials are needed by sending a hash value to the registration service that is based on current subscription credentials as held by the wireless communication device, and receiving a return indication from the registration service.

21. The wireless communication device of claim 18, wherein the wireless communication device is configured to communicate with the registration service to determine whether new subscription credentials are needed by sending first information, which is associated with the current subscription credentials as held by the wireless communication device, to the registration service, and receiving a return indication from the registration service.

22. The wireless communication device of claim 18, wherein the wireless communication device is configured to communicate with the registration service to determine whether new subscription credentials are needed by whether first information, which is held by the wireless communication device for the current subscription information as held by the wireless communication device, matches second information received from the registration service.

23. The wireless communication device of claim 18, wherein the wireless communication device is configured to obtain new subscription credentials for the wireless communication device comprises receiving network address information from the registration service that identifies a credentialing server from which the new subscription credentials are to be obtained, and using the temporary network access to contact the credentialing server to obtain the new subscription credentials.

24. The wireless communication device of claim 13, wherein the wireless communication device is configured to, after obtaining the new subscription credentials, change from the temporary default limited-access credentials to the new subscription credentials for subsequently gaining network access, while retaining the temporary default limited-access credentials at the wireless communication device for future reversion as needed.

25. A method of facilitating automatic acquisition of new subscription credentials by a wireless communication device, the method comprising, at a registration service:
receiving first information from a wireless communication device that has reverted from using initial subscription credentials to temporary default limited-access credentials responsive to a failure to gain network access using the initial subscription credentials, and has used the limited-access credentials to gain temporary network access, said first information being included in or derived from the initial subscription credentials held by the wireless communication device;
comparing the first information to second information held by the registration service, said second information being included in or derived from current subscription credentials associated with a current home network operator of the wireless communication device; and
indicating to the wireless communication device that new subscription credentials are needed by the wireless communication device, based on detecting a mismatch between the first and second information.

26. The method of claim 25, wherein indicating to the wireless communication device that new subscription credentials are needed by the wireless communication device comprises sending network address information to the wireless communication device, for a credentialing server from which the new subscription credentials can be obtained.

27. A registration server configured to facilitate automatic acquisition of new subscription credentials by a wireless communication device, the registration server comprising one or more processing circuits configured to:
receive first information from a wireless communication device that has reverted from using initial subscription credentials to temporary default limited-access credentials responsive to a failure to gain network access using the initial subscription credentials, and has used the limited-access credentials to gain temporary network access, said first information being included in or derived from the initial subscription credentials held by the wireless communication device;
compare the first information to second information held by the registration server, said second information being included in or derived from current subscription credentials associated with a current home network operator of the wireless communication device; and indicate to the wireless communication device that new subscription credentials are needed by the wireless communication device, based on detecting a mismatch between the first and second information.

28. The registration server of claim 27, wherein, if the wireless communication device needs new subscription credentials, the registration server is configured to send network address information to the wireless communication device that identifies a credentialing server from which the new subscription credentials can be obtained.

* * * * *

UNITED STATES PATENT AND TRADEMARK OFFICE
CERTIFICATE OF CORRECTION

| | | Page 1 of 1 |
|---|---|---|
| PATENT NO. | : 8,553,883 B2 | |
| APPLICATION NO. | : 12/140728 | |
| DATED | : October 8, 2013 | |
| INVENTOR(S) | : Salmela et al. | |

It is certified that error appears in the above-identified patent and that said Letters Patent is hereby corrected as shown below:

In the Specification

In Column 3, Line 7, delete "agreement home" and insert -- agreement/home --, therefor.

In Column 4, Line 59, delete "processing circuits 22." and insert -- processing circuits 20. --, therefor.

In Column 7, Line 39, delete "communication device 26," and insert -- communication device 10, --, therefor.

In Column 9, Lines 21-22, delete "subscription credentials 30." and insert -- subscription credentials 26. --, therefor.

Signed and Sealed this
Thirteenth Day of January, 2015

Michelle K. Lee
*Deputy Director of the United States Patent and Trademark Office*